United States Patent
Lee et al.

(10) Patent No.: US 8,761,964 B2
(45) Date of Patent: Jun. 24, 2014

(54) COMPUTING DEVICE AND METHOD FOR CONTROLLING UNMANNED AERIAL VEHICLE IN FLIGHT SPACE

(71) Applicant: Hon Hai Precision Industry Co., Ltd., New Taipei (TW)

(72) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/674,959

(22) Filed: Nov. 13, 2012

(65) Prior Publication Data
US 2013/0253733 A1 Sep. 26, 2013

(30) Foreign Application Priority Data
Mar. 26, 2012 (TW) .............................. 101110310 A

(51) Int. Cl.
*G06K 9/00* (2006.01)
*G07C 5/00* (2006.01)
*G05D 1/02* (2006.01)

(52) U.S. Cl.
CPC .............. *G07C 5/008* (2013.01); *G05D 1/0202* (2013.01); *G06T 2207/10016* (2013.01)
USPC .......... 701/2; 701/3; 701/4; 701/23; 244/189; 244/190; 244/195; 382/103; 382/190; 382/194; 382/203; 382/209; 700/245

(58) Field of Classification Search
USPC .......... 701/23, 2–18, 120; 244/189, 190, 195, 244/196, 222; 382/103, 115–128; 702/152, 702/153, 166; 700/59, 245, 258, 259
See application file for complete search history.

(56) References Cited

U.S. PATENT DOCUMENTS

| | | | |
|---|---|---|---|
| 7,551,980 B2* | 6/2009 | Sakagami et al. | 700/258 |
| 8,346,391 B1* | 1/2013 | Anhalt et al. | 700/248 |
| 8,396,252 B2* | 3/2013 | El Dokor | 382/106 |
| 8,521,339 B2* | 8/2013 | Gariepy et al. | 701/2 |
| 2002/0036617 A1* | 3/2002 | Pryor | 345/156 |
| 2005/0271279 A1* | 12/2005 | Fujimura et al. | 382/203 |
| 2007/0093945 A1* | 4/2007 | Grzywna et al. | 701/23 |
| 2008/0086241 A1* | 4/2008 | Phillips et al. | 701/2 |
| 2008/0253613 A1* | 10/2008 | Jones et al. | 382/103 |
| 2009/0180668 A1* | 7/2009 | Jones et al. | 382/103 |
| 2011/0304650 A1* | 12/2011 | Campillo et al. | 345/661 |
| 2012/0236031 A1* | 9/2012 | Haddick et al. | 345/633 |
| 2012/0308076 A1* | 12/2012 | Piekniewski et al. | 382/103 |

* cited by examiner

*Primary Examiner* — Thomas Tarcza
*Assistant Examiner* — Tyler J Lee
(74) *Attorney, Agent, or Firm* — Novak Druce Connolly Bove + Quigg LLP

(57) ABSTRACT

In a method for controlling an unmanned aerial vehicle (UAV) in a flight space using a computing device, a 3D sample database is created and store in a storage device of the computing device. The computing device includes a depth-sensing camera that captures a 3D scene image of a scene in front of a user, and senses a depth distance between the user and the depth-sensing camera. A 3D person image of the user is detected from the 3D scene image, and gesture information of the user is obtained by comparing the 3D person image with human gesture data stored in the 3D sample database. The method converts the gesture information of the user into one or more flight control commands, and drives a driver of the UAV to control the UAV to fly in a flight space according to the flight control commands.

15 Claims, 5 Drawing Sheets

COMPUTING DEVICE AND METHOD FOR CONTROLLING UNMANNED AERIAL VEHICLE IN FLIGHT SPACE

BACKGROUND

1. Technical Field

The embodiments of the present disclosure relate to aircraft control systems and methods, and more particularly to a computing device and method for controlling an unmanned aerial vehicle (UAV) in a flight space.

2. Description of related art

An unmanned aerial vehicle (UAV), also known as a Unmanned aircraft System (UAS) or a remotely piloted aircraft (RPA) or unmanned aircraft, is a machine which functions either by a remote control of a navigator or pilot or autonomously, that is, as a self-directing entity. UAVs can fly autonomously or be piloted remotely without carrying a human operator, and are often preferred for missions that are too dull or dangerous for manned aircraft. Some UAVs are controlled to fly autonomously based on a pre-programmed flight plan using a dynamic automation system. However, the dynamic automation system may be more complex, and also cannot effectively control the UAV to fly within a flight space. Therefore, there is a need for a system and method for effectively controlling an UAV to fly within the flight space.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean "at least one."

In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives.

Figure 1:
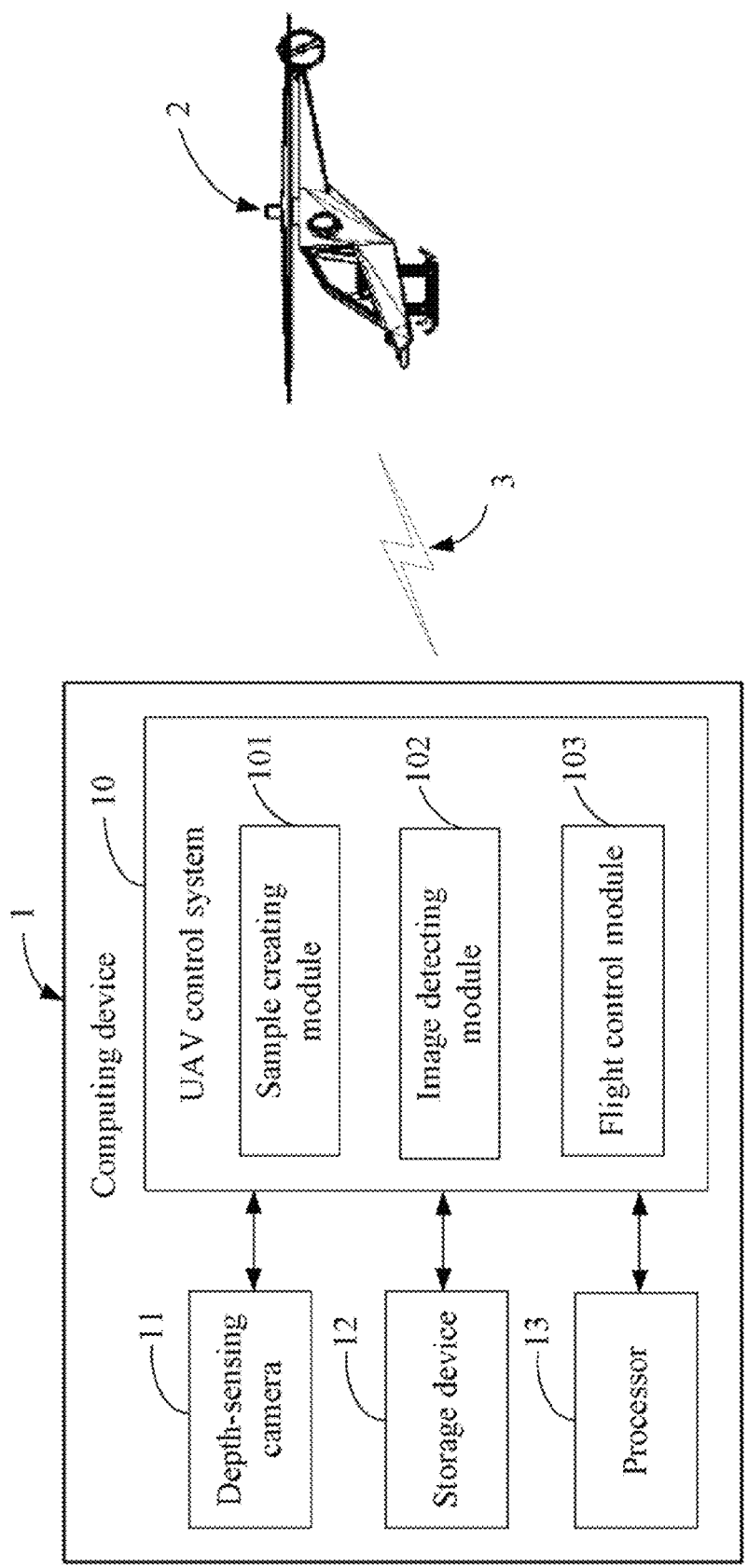
FIG. 1 is a block diagram of one embodiment of a computing device including an unmanned aerial vehicle (UAV) control system.

FIG. 1 is a block diagram of one embodiment of a computing device 1 including an unmanned aerial vehicle (UAV) control system 10. In the embodiment, the computing device 1 may further include a depth-sensing camera 11, a storage device 12, and at least one processor 13. The computing device 1 may be a host computer, a workstation computer, or a server computer. The computing device 1 connects to a UAV 2 through a wireless network 3, such as an WIFI network, a ZIGBEE network, or other wireless local area network (LAN). In one embodiment, the UAV control system 10 may include computerized instructions in the form of one or more programs that are stored in the storage device 12 and executed by the at least one processor 13. It should be understood that FIG. 1 illustrates only one example of the computing device 1 that may include more or fewer components than illustrated, or have a different configuration of the various components in other embodiments.

The UAV control system 10 generates one or more flight control commands according to different gestures of a user who controls the UAV 2 to fly in a flight space, and controls or adjusts a flying mode of the UAV 2 in the flight space according to the flight control commands. Each gesture of the user corresponds to a flight control command, which controls or adjusts the flying state of the UAV 2 in the flight space. In one embodiment, the user may move his/her hands upwards, downwards, leftwards, or rightwards, and/or rotate his/her hands clockwise or counterclockwise. The flight control commands may include a first control command for controlling the UAV 2 to climb, to descend, to bank left and right, and a second adjust command for adjusting a flying mode of the of the UAV 2, such as a flying speed adjustment mode or a flight direction mode of the UAV 2.

In one embodiment, the depth-sensing camera 11 is a time of flight (TOF) camera device having a 3D image capturing functionality, and can sense a depth distance between a camera lens of the depth-sensing camera 11 and the user. The depth-sensing camera 11 captures one or more 3D images from a scene in front of the user when the user controls the UAV 2 to fly in the flight space. In the embodiment, the user is illuminated by a short light, and the depth-sensing camera 11 measures a time taken from when the light hits the user until the reflected light reaches the depth-sensing camera 11 (called "the reflected time"). This reflected time is directly proportional to a depth distance between the camera lens and the user. Therefore, the depth-sensing camera 11 senses the depth distance between the camera lens and the user according to a pulse time of the short light illuminating at the user and the reflected time of the reflected light from the user.

In one embodiment, the storage device 12 may be an internal storage system, such as a random access memory (RAM) for the temporary storage of information, and/or a read only memory (ROM) for the permanent storage of information. In some embodiments, the storage device 12 may be an external storage system, such as an external hard disk, a storage card, or a data storage medium.

In one embodiment, the UAV control system 10 may include a 3D sample creating module 101, an image detecting module 102, and a flight control module 103. The modules 101-103 may comprise computerized codes in the form of one or more programs that are stored in the storage device 12 and executed by the processor 13 to provide functions for implementing the modules. Detailed descriptions of each module will be given with reference to FIG. 2 as described in the following paragraphs.

Figure 2:
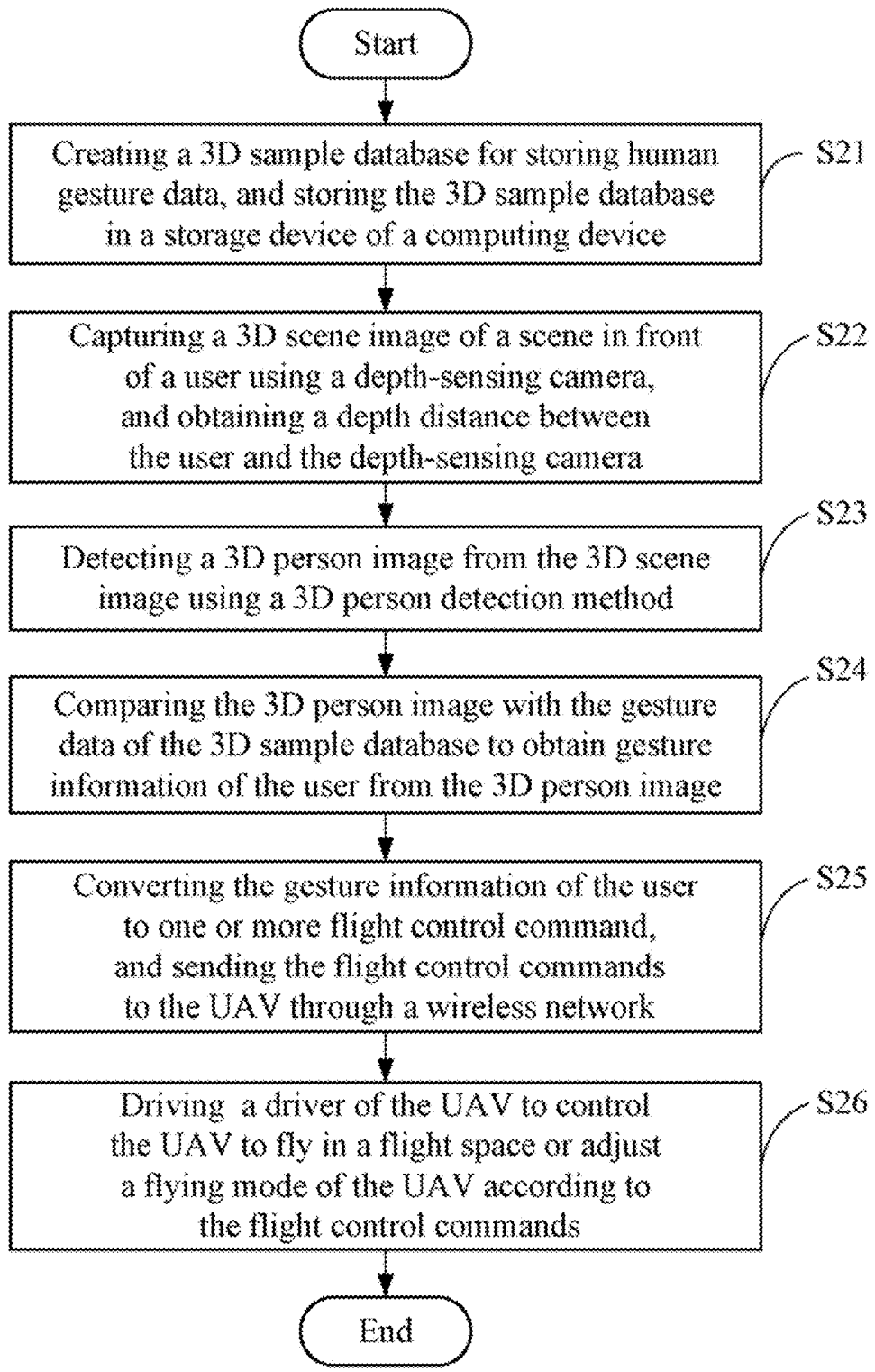
FIG. 2 is a flowchart of one embodiment of a method for controlling the UAV using the computing device of FIG. 1.

FIG. 2 is a flowchart of one embodiment of a method for controlling the UAV 2 in a flight space using the computing device 1 of FIG. 1. In the embodiment, the method can generate one or more flight control commands according to gestures of the user who controls the UAV 2 to fly in a flight space, and controls or adjusts a flying mode of the UAV 2 in the flight space according to each of the flight control commands Depending on the embodiment, additional blocks may be added, others removed, and the ordering of the blocks may be changed.

In block S21, the 3D sample creating module 101 creates a 3D sample database that stores human gesture data, and stores the 3D sample database in the storage device 12. The human gesture data includes data concerning characteristic gestures of humans to control the UAV 2 to fly in the flight space, characteristic data of actions of human for adjusting flying modes of the UAV 2 in the flight space. In one example with respect to FIG. 3, the human gesture data includes data indicative of a person moving in his/her hands upwards, downwards, leftwards, or rightwards, and/or rotates his/her hands in a clockwise or in a counterclockwise direction. The human gesture data can include movement of one or more hands of the person or other parts such as a leg.

Figure 3:
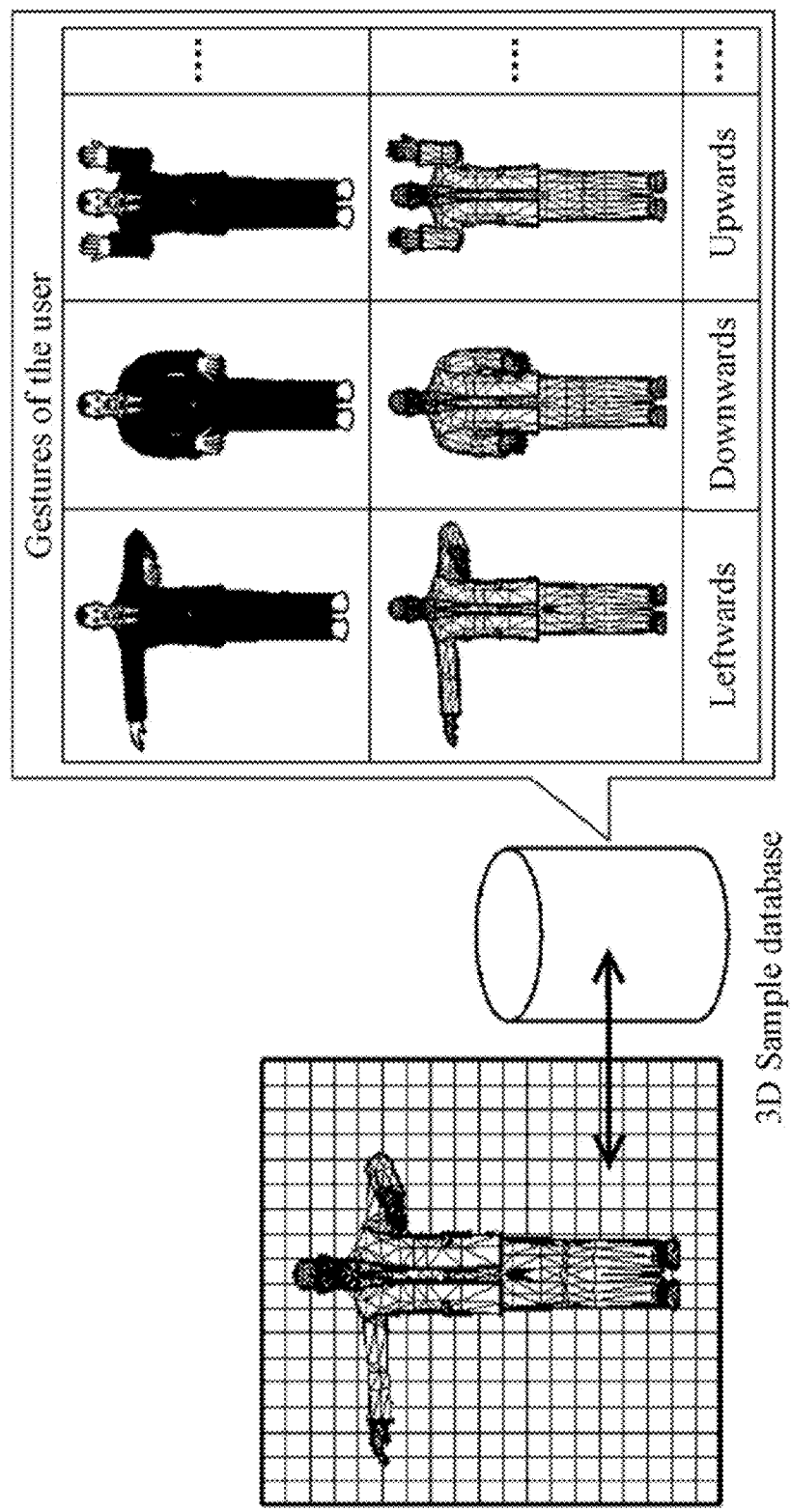
FIG. 3 is a schematic diagram illustrating one example of creating a 3D sample database for storing various human gesture data.

FIG. 3 is a schematic diagram illustrating one example of creating the 3D sample database. In one embodiment, the human gesture data may be captured using the depth-sensing camera 11, a data relationship is built between each of the human gesture data and each of the flight control commands of the UAV 2, and the human gesture data are stored in the 3D sample database for determine the gestures and actions of the user in real time. The flying modes may include a climbing mode, a descending mode, a leftward or rightward banking mode, a flying speed adjustment mode, and a flight direction mode of the UAV 2.

Figure 4:
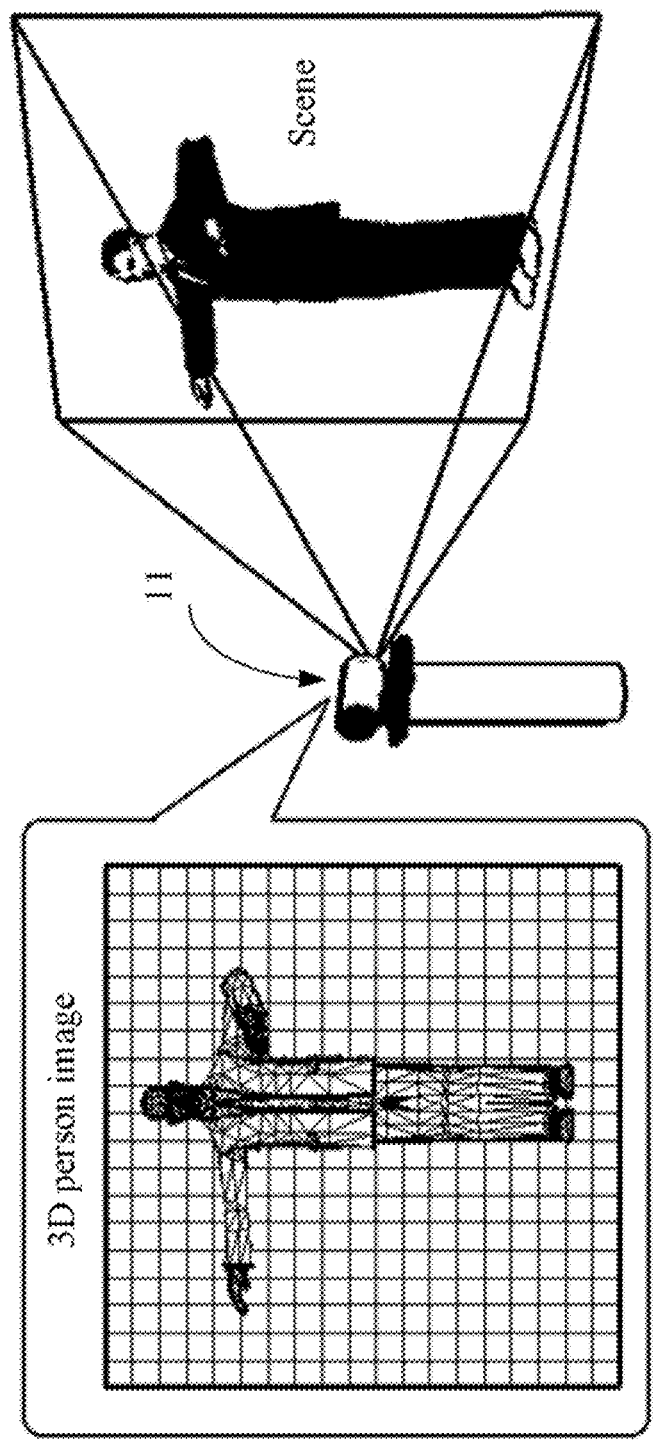
FIG. 4 is a schematic diagram illustrating one example of capturing a 3D scene image of a 3D scene in front of the user using a depth-sensing camera.

In block S22, the image detecting module 102 captures a 3D image of a scene (hereinafter "3D scene image") in front of the user using the depth-sensing camera 11 when the user controls the UAV 2 to fly the flight space (hereinafter "3D scene image"), and obtains a depth distance between the user and the depth-sensing camera 11 using the depth-sensing camera 11. In one embodiment, the depth-sensing camera 11 senses the depth distance between the depth-sensing camera 11 and the user, and captures one or more 3D scene images from the scene in front of the user. FIG. 4 is a schematic diagram illustrating one example of capturing a 3D scene image of a scene in front of the user using the depth-sensing camera 11. In the example, the depth-sensing camera 11 captures a 3D scene image from the scene in front of the user, and senses the depth distance between the depth-sensing camera 11 and the user.

In block S23, the image detecting module 102 detects a person image of the user (hereinafter "3D person image") from the 3D scene image of the scene using a 3D person detection method. In the embodiment, the 3D person detection method comprises steps of: (a) the image detecting module 102 converts a depth distance between each point of the user and the depth-sensing camera 11 into a pixel value, and stores all of the pixel value in a data array; and (b) the image detecting module 102 compares the pixel values of the data array with characteristic data of the user stored in the 3D sample database to obtain the 3D person image from the 3D scene image.

In block S24, the image detecting module 102 compares the 3D person image with the human gesture data of the 3D sample database to obtain gesture information of the user from the 3D person image. The gesture information of the user may include gesture and action data relating to the user when the user controls the UAV 2 to fly in the flight space.

In block S25, the flight control module 103 converts the gesture information of the user to a flight control command for controlling the UAV 2 in the flight space, and sends the flight control command to the UAV 2 through the wireless network 3. In one embodiment, the flight control commands may include a first control command for controlling the UAV 2 to fly upwards, downwards, leftwards, and rightwards, and a second adjustment command for adjusting the flying mode of the of the UAV 2.

In block S26, the flight control module 103 drives a driver (e.g. an engine) of the UAV 2 to control the UAV 2 to fly in the flight space or adjust the flying mode of the UAV 2 according to the flight control command In one embodiment, the flight control module 103 can control the UAV 2 to fly upwards, downwards, leftwards, and rightwards, and adjust the flying mode of the UAV 2 including the speed of flight or direction of the UAV 2.

Figure 5:
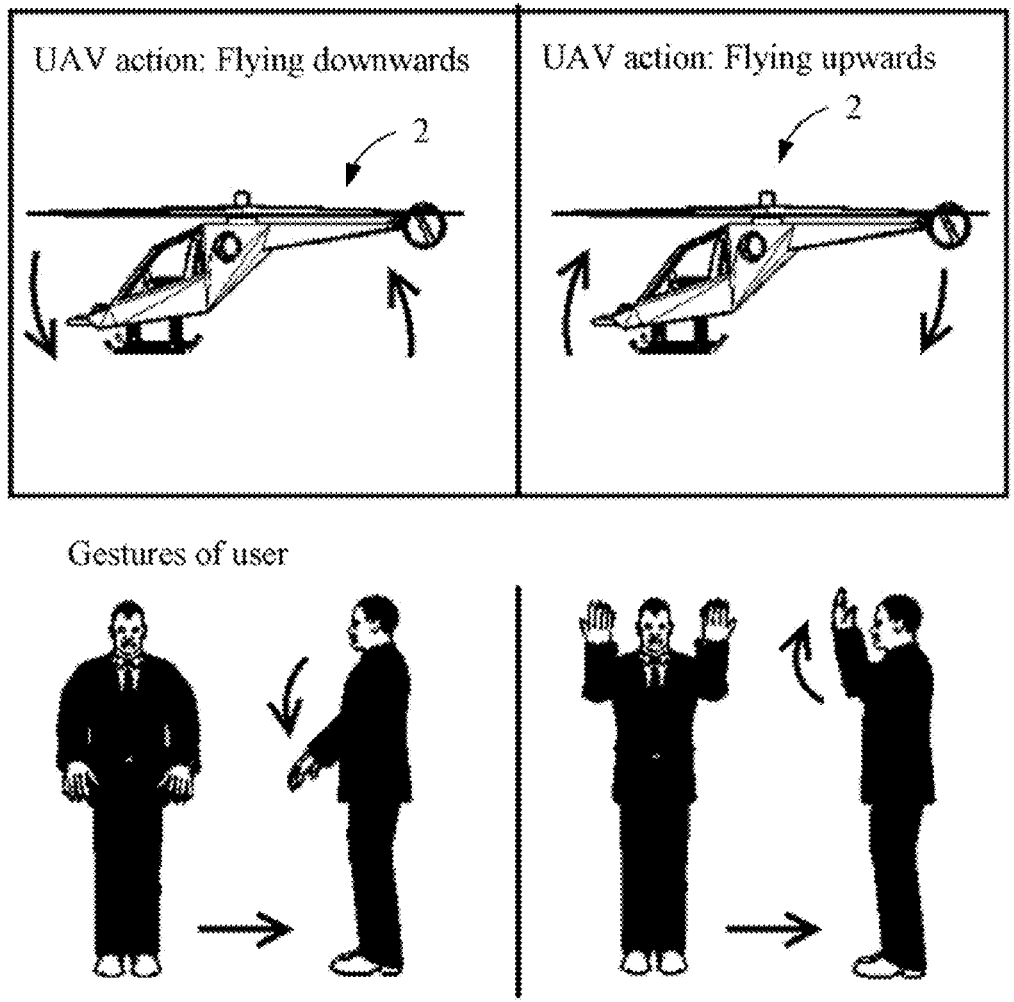
FIG. 5 is a schematic diagram illustrating one example of controlling the UAV to fly in a flight space according to gestures of the user.

FIG. 5 is a schematic diagram illustrating one example of controlling the UAV 2 to fly in a flight space according to gestures of the user. In the example, the UAV 2 flies leftwards in the flight space when the user moves his right hand straight out, and flies right when the user moves his left hand straight out. The UAV 2 flies down when the user extends his arms straight down with the palms of the hands inwards, and flies up when the user holds his forearms straight up with the palms inward.

All of the processes described above may be embodied in, and fully automated via, functional code modules executed by one or more general purpose processors of the computing devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:
1. A computing device, comprising:
   a depth-sensing camera;
   a storage device;
   at least one processor; and
   one or more programs stored in the storage device comprising one or more programs and executable by the at least one processor, the one or more programs comprising:
   an image detecting module that captures a 3D scene image of a scene in front of a user using the depth-sensing camera, obtains a depth distance between the user and the depth-sensing camera using the depth-sensing camera, detects a 3D person image of the user from the 3D scene image, and compares the 3D person image with human gesture data stored in a 3D sample database to obtain gesture information of the user from the 3D person image, wherein the 3D sample database is created by capturing the human gesture data using the depth-sensing camera, building a data relationship between each of the human gesture data and a flight control command of an unmanned aerial vehicle (UAV), and storing the human gesture data in the 3D sample database; and
   a flight control module that converts the gesture information of the user into one or more flight control commands, sends the flight control commands to the UAV through a wireless network, and driving a driver of the UAV to control the UAV to fly in a flight space or adjust a flying mode of the UAV according to the flight control commands.

2. The computing device according to claim 1, wherein the depth-sensing camera is a time of flight (TOF) camera device having a 3D image capturing functionality.

3. The computing device according to claim 1, wherein the depth-sensing camera senses the depth distance between the depth-sensing camera and the user according to a pulse time of a short light illuminated at the user and a reflected time of a reflected light of the short light.

4. The computing device according to claim 1, wherein the 3D person image of the user is detected from the 3D scene image by performing steps of:
converting a depth distance between each point of the user and the depth-sensing camera into a pixel value, and storing all of the pixel value in a data array; and
comparing the pixel values of the data array with characteristic data of the user stored in the 3D sample database to obtain the 3D person image from the 3D scene image.

5. The computing device according to claim 1, wherein the flight control commands comprise a first control command for controlling the UAV to fly upwards, downwards, leftwards or rightwards, and a second adjustment command for adjusting a flying speed or a flying direction of the UAV.

6. A method for controlling an unmanned aerial vehicle (UAV) in a flight space using a computing device, the method comprising:
capturing a 3D scene image of a scene in front of a user using a depth-sensing camera of the computing device, and obtaining a depth distance between the user and the depth-sensing camera using the depth-sensing camera;
detecting a 3D person image of the user from the 3D scene image;
comparing the 3D person image with gesture data stored in a 3D sample database to obtain gesture information of the user from the 3D person image, wherein the 3D sample database is created by capturing the human gesture data using the depth-sensing camera, building a data relationship between each of the human gesture data and a flight control command of the UAV, and storing the human gesture data in the 3D sample database;
converting the gesture information of the user to one or more flight control commands, and sending the flight control commands to the UAV through a wireless network; and
driving a driver of the UAV to control the UAV to fly in a flight space or adjust a flying mode of the UAV according to the flight control commands.

7. The method according to claim 6, wherein the depth-sensing camera is a time of flight (TOF) camera device having a 3D image capturing function.

8. The method according to claim 6, wherein the depth-sensing camera senses the depth distance between the depth-sensing camera and the user according to a pulse time of a short light illuminated at the user and a reflected time of a reflected light of the short light.

9. The method according to claim 7, wherein the 3D person image of the user is detected from the 3D scene image by performing steps of:
converting a depth distance between each point of the user and the depth-sensing camera into a pixel value, and storing all of the pixel values in a data array; and
comparing the pixel values of the data array with characteristic data of the user stored in the 3D sample database to obtain the 3D person image from the 3D scene image.

10. The method according to claim 6, wherein the flight control commands comprise a first control command for controlling the UAV to fly upwards, downwards, leftwards or rightwards, and a second adjustment command for adjusting a flying speed or a flying direction of the UAV.

11. A non-transitory computer-readable storage medium having stored thereon instructions that, when executed by at least one processor of a computing device, cause the computing device to perform a method for controlling an unmanned aerial vehicle (UAV) in a flight space, the method comprising:
capturing a 3D scene image of a scene in front of a user using a depth-sensing camera of the computing device, and obtaining a depth distance between the user and the depth-sensing camera using the depth-sensing camera;
detecting a 3D person image of the user from the 3D scene image;
comparing the 3D person image with human gesture data stored in a 3D sample database to obtain gesture information of the user from the 3D person image, wherein the 3D sample database is created by capturing the human gesture data using the depth-sensing camera, building a data relationship between each of the human gesture data and a flight control command of the UAV, and storing the human gesture data in the 3D sample database;
converting the gesture information of the user to one or more flight control commands, and sending the flight control commands to the UAV through a wireless network; and
driving a driver of the UAV to control the UAV to fly in a flight space or adjust a flying mode of the UAV according to the flight control commands.

12. The storage medium according to claim 11, wherein the depth-sensing camera is a time of flight (TOF) camera device having a 3D image capturing functionality.

13. The storage medium according to claim 11, wherein the depth-sensing camera senses the depth distance between the depth-sensing camera and the user according to a pulse time of a short light illuminated at the user and a reflected time of a reflected light of the short light.

14. The storage medium according to claim 11, wherein the 3D person image of the user is detected from the 3D scene image by performing steps of:
converting a depth distance between each point of the user and the depth-sensing camera into a pixel value, and storing all of the pixel value in a data array; and
comparing the pixel values of the data array with characteristic data of the user stored in the 3D sample database to obtain the 3D person image from the 3D scene image.

15. The storage medium according to claim 11, wherein the flight control commands comprise a first control command for controlling the UAV to fly upwards, downwards, leftwards or rightwards, and a second adjustment command for adjusting a flying speed or a flying direction of the UAV.

* * * * *